(12) United States Patent
Coe

(10) Patent No.: X6456
(45) Date of Patent: Apr. 7, 1831

(54) CHURN, CHURNING CREAM BY ATMOSPHERIC AIR

(76) Inventor: Elias V. Coe

Elias. Y. Coe. Warwick N.Y.

Letters Patent

The Schedule referred to in these Letters Patent and making part of the same containing a description in the words of the said Elias Y. Coe himself of his improvement in the art of Churning To all whom these Presents shall Come Be it known that I Elias Y Coe of Warwick in the county of Orange and State of New York have invented a new and useful improvement in the art of Churning Milk or Cream and that the following is a full and exact description of the art or manner of Churning as invented or applied by me, which consists in the application or forcing air into Milk or Cream by means of an air or forcing pump, bellows or other like Machinery or Instrument - propelled by hand, water, weight, steam, wind, animal or any other power.

Witnesses
Benjamin Coe
Catharine [illegible]

Elias. Y. Coe.

Exd
[illegible]